United States Patent [19]
Sakai et al.

[11] 3,950,946
[45] Apr. 20, 1976

[54] VACUUM PRODUCING SYSTEM

[75] Inventors: Toshimitsu Sakai, Toyota; Isamu Suzuki, Aichi, both of Japan

[73] Assignees: Toyota Jidosha Kogyo Kabushiki Kaisha, Toyota; Aisan Kogyo Kabushiki Kaisha, Obu, both of Japan

[22] Filed: Mar. 4, 1975

[21] Appl. No.: 555,094

[30] Foreign Application Priority Data
May 23, 1974    Japan........................ 49-58907[U]

[52] U.S. Cl................................. 60/407; 60/409; 60/412; 303/12; 417/223
[51] Int. Cl.²........................................ F15B 15/18
[58] Field of Search............ 60/397, 407, 409, 410, 60/411, 412, DIG. 2, 415, 418; 417/223, 306; 303/12, 31

[56] References Cited
UNITED STATES PATENTS

| | | |
|---|---|---|
| 2,142,514 | 1/1939 | Jones .............................. 60/407 UX |
| 3,006,535 | 10/1961 | White .............................. 60/397 X |

Primary Examiner—Edgar W. Geoghegan
Attorney, Agent, or Firm—Stevens, Davis, Miller & Mosher

[57] ABSTRACT

A control system for a diaphragm vacuum pump comprises a vacuum sensor disposed within the vacuum chamber of a pneumatically operated device for detecting a predetermined vacuum pressure to ensure the effective operation of the device and generating an output signal therefrom. A switchover solenoid valve is disposed within the pneumatic connection between the suction port of the vacuum pump and the vacuum chamber of the device is energized in response to the output signal of the sensor to selectively open the pumping chamber of the pump to the air through the suction port and close the vacuum chamber of the device.

6 Claims, 2 Drawing Figures

VACUUM PRODUCING SYSTEM

BACKGROUND OF THE INVENTION

The present invention relates to a vacuum producing system for pneumatically operated devices, and more particularly to a control system for a diaphragm vacuum pump drivingly connected to a prime power source such as a drive shaft of a vehicle engine to ensure operation of the pneumatically operated devices.

When the vacuum pressure necessary for a pneumatically operated device such as a vacuum brake booster for an automotive vehicle or the like is produced within the vacuum chamber of the device by reciprocation of a diaphragm vacuum pump, a large pressure difference exists between the sides of the spring loaded diaphragm piston of the vacuum pump in accordance with the increase of the vacuum pressure within the vacuum chamber of the device, thereby causing a heavy load to act on the diaphragm piston. Although the pneumatically operated device needs to be operated only in necessity, conveniently the diaphragm vacuum pump is constantly operated to ensure the operation of the pneumatically operated device when needed and it is thus exposed to the heavy usage which causes it to lose its durability and to shorten its life.

SUMMARY OF THE INVENTION

The main object of the present invention is, therefore, to provide an improved control system for a diaphragm vacuum pump to automatically eliminate the heavy load acting on the vacuum pump when the vacuum pressure reaches or exceeds a predetermined value within the vacuum chamber of the pneumatically operated device.

According to the present invention, a control system for a diaphragm vacuum pump comprises a vacuum sensor disposed within the vacuum chamber of a pneumatically operated device for detecting a predetermined vacuum pressure to ensure the effective operation of the device and generating an output signal therefrom and a switchover means disposed within the pneumatic connection between the suction port of the vacuum pump and the vacuum chamber of the device to be activated in response to the output signal of the sensor to selectively open the pumping chamber of the pump to the air through the suction port and close the vacuum chamber of the device.

BRIEF DESCRIPTION OF THE DRAWINGS

The other objects and advantages of the present invention will become apparent upon consideration of the following detailed description and the accompanying drawings in which.

DESCRIPTION OF THE PREFERRED EMBODIMENTS

Figure 1:
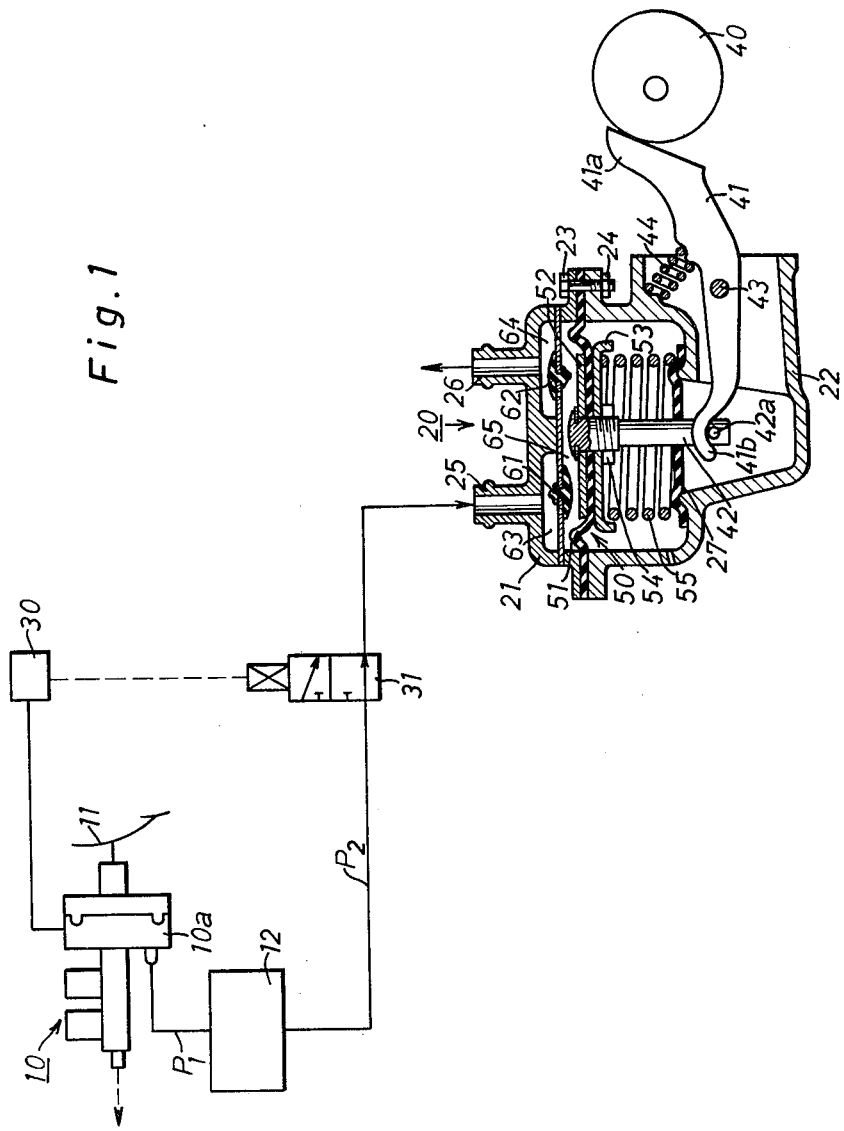
FIG. 1 is a schematic diagram of a control system for a diaphragm vacuum pump as a preferred embodiment of the present invention.

Referring now to the drawings, particularly to FIG. 1, disclosed is a preferred embodiment of the present invention, which is applied to a vacuum producing system for a vacuum brake booster of a vehicle. In FIG. 1, a vacuum pump 20 is connected to a vacuum brake booster 10 by way of a switchover solenoid valve 31, a vacuum reservoir 12 and conduits $P_2$ and $P_1$.

The brake booster 10 is of a conventional type which operates in response to depression of a brake pedal 11. A vacuum chamber 10a of the booster 10 is connected to the vacuum reservoir 12 by the conduit $P_1$ and to a vacuum sensor 30. This vacuum sensor 30 is to generate an electric output signal upon detecting the vacuum pressure within the vacuum chamber 10a to be at or exceed a predetermined value to ensure the operation of the brake booster.

The vacuum pump 20 is of a diaphragm type and is provided with a rocker arm 41 to be operated by rotation of an eccentric cam 40 driven by the engine of the vehicle, an operation rod 42 reciprocated by the rocker arm 41 and a diaphragm piston assembly 50 reciprocated by the operation rod 42. The rocker arm 41 is swingably journalled on the inner wall of a pump body 22 by a pivot pin 43. The bottom face of the outer end 41a of the rocker arm 41 engages with the cam face of the eccentric cam 40. Meanwhile, the bottom face of the inner end 41b of the rocker arm 41 engages detachably with a pin 42a fixed on the lower end of the operation rod 42. The rocker arm 41 is normally biased clockwise in the figure by a compressed spring 44 disposed between the inner wall of the pump body 22 and a portion of the rocker arm 41. The diaphragm piston assembly 50 comprises a flexible diaphragm 51 of which the annular rim is interposed and hermetically clamped between the engaging portions of a cover 21 and the pump body 22 by bolts 23 and nuts 24. The operation rod 42 is connected at the upper end thereof with the central portion of the diaphragm 51 by a fastening nut 54 through upper and lower protector plates 52 and 53.

Formed above the diaphragm piston assembly 50 is a pumping chamber 65 communicating with a suction chamber 63 and a discharge chamber 64 respectively through a suction check valve 61 and a discharge check valve 62. The suction chamber 63 is provided with a suction port 25 in communication with the vacuum reservoir 12 by the conduit $P_2$ through the switchover solenoid valve 31. The discharge chamber 64 includes an exhaust port 26 which opens to the air. Beneath the diaphragm piston assembly 50 is a coil spring 55 to normally bias the diaphragm piston 50 upwardly in the figure. The spring 55 engages at one end thereof with the bottom face of the lower protector plate 53 and at the other end with the inner wall of the pump body 22 through a sealing member 27.

The switchover solenoid valve 31 normally communicates the suction port 25 of the vacuum pump 20 with the reservoir 12. When energized, the solenoid valve 31 hermetically closes the reservoir 12 and opens the suction port 25 to the air.

Described below in detail is the operation of the preferred embodiment of the above explained construction. Under the charging condition of the vacuum producing system, the switchover valve 31 keeps communication between the suction port 25 and the reservoir 12, thereby to increase the degree of vacuum within the reservoir 12 and the vacuum chamber 10a of the brake booster 10 by pumping operation of the vacuum pump 20. The continued pumping operation of the vacuum pump 20 increases the pressure difference between the upper and lower sides of the diaphragm piston assembly 50 within the vacuum pump 20. This pressure difference causes a heavy load on the flexible diaphragm 51, the operation rod 42, the rocker arm 41 and other driven component parts and portions.

When the degree of vacuum reaches or exceeds a predetermined value within the vacuum chamber 10a of the brake booster 10, the vacuum sensor 30 detects the vacuum value to generate its output signal, thereby to energize the switchover solenoid valve 31. When energized, the switchover valve 31 hermetically closes the reservoir 12 and the vacuum chamber 10a of the booster 10, whereas the suction port 25 of the vacuum pump 20 is communicated with the air. As a result, the brake booster 10 maintains its operable condition and the negative pressure within the pumping chamber 65 of the vacuum pump 20 becomes substantially equal to that of the air. Thus, eliminated is the heavy load acting on the diaphragm 51, the operation rod 42, the rocker arm 41 and other driven component parts and portions.

Use of the brake booster 10 decreases the vacuum value within its vacuum chamber 10a. When the vacuum value within the vacuum chamber 10a decreases to or below a predetermined one, the sensor 30 ceases its signal generation, thereby to return the switchover valve 31 to its original position.

Figure 2:
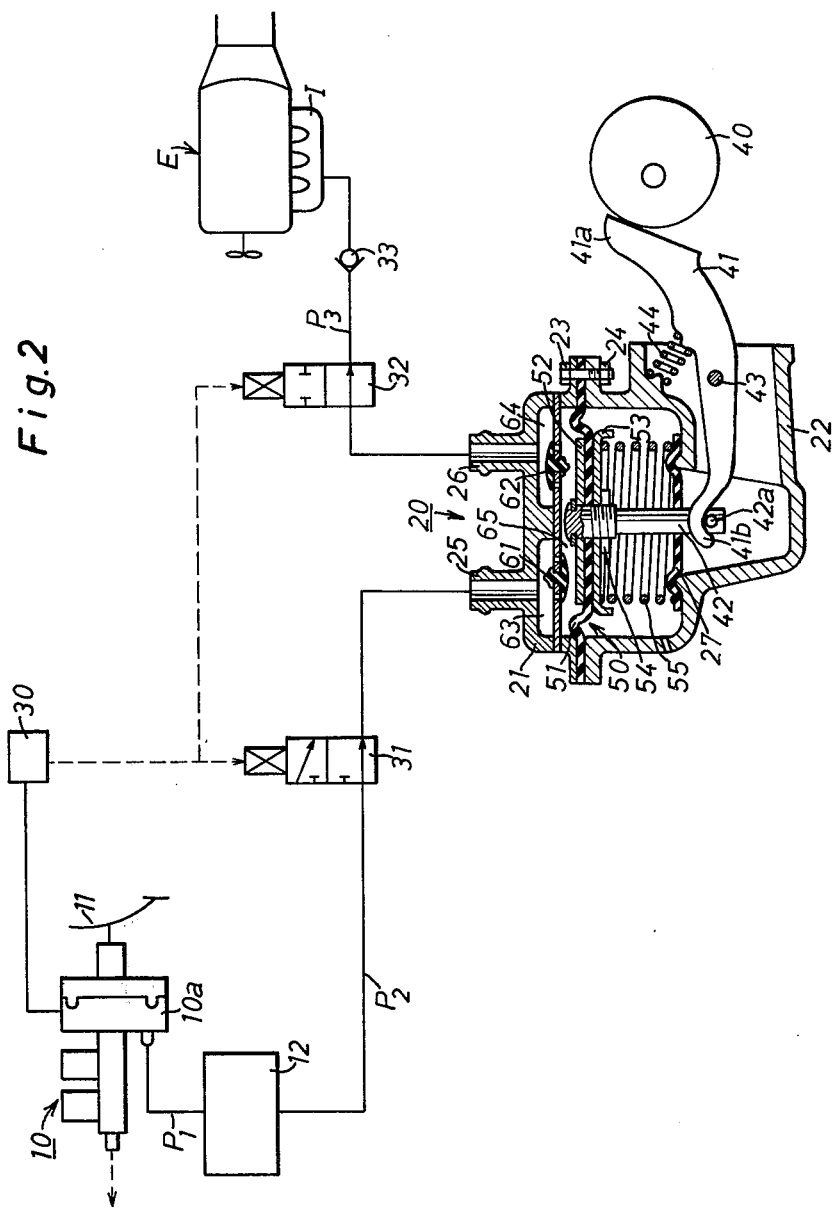
FIG. 2 shows schematically another control system for a diaphragm vacuum pump as another embodiment of the present invention.

FIG. 2 illustrates another embodiment of the present invention, wherein the exhaust port 26 of the vacuum pump 20 is connected to an intake-manifold I of the vehicle prime mover engine E, by a conduit $P_3$. A second switchover solenoid valve 32 is disposed within the conduit $P_3$ and is energized by the electric signal generated from the vacuum sensor 30. This second switchover valve 32 normally connects the exhaust port 26 of the vacuum pump 20 to the intake-manifold I of the engine E. When energized by the electric signal from the sensor 30, the second switchover valve 32 blocks the communication between the exhaust port 26 and the engine intake-manifold I and hermetically closes the exhaust port 26. A check valve 33 is also disposed within the conduit $P_3$ so as to protect the vacuum pump 20 by permitting the air to flow only from the pump side to the engine side. All other constructions and functions are the same as those in the previous embodiment and the same reference numerals and characters are used for the same component parts and portions, thereby to eliminate duplicated description.

Described hereinafter in detail is the mode of operation of this embodiment. Under the charging condition of this vacuum producing system, the first switchover valve 31 maintains communication between the suction port 25 of the vacuum pump 20 and the vacuum chamber 10a of the brake booster 10, and the second switchover valve 32 maintains communication between the exhaust port 26 and the intake-manifold I of the engine E. Thus, the air within the vacuum chamber 10a of the booster 10 is discharged into the intake-manifold I by the pumping operation of the vacuum pump 20. In this instance, the continued pumping operation of the pump 20 increases the pressure difference between the upper and lower sides of the diaphragm piston assembly 50 as the vacuum pressure increases within the vacuum chamber 10a. This pressure difference causes a heavy load to act on the diaphragm 51, the operation rod 42, the rocker arm 41 and other driven parts and portions.

When the vacuum pressure within the vacuum chamber 10a reaches or exceeds the predetermined value, the sensor 30 detects the vacuum value to generate its electric signal, thereby to energize the first and second solenoid valves 31 and 32. When energized, the first switchover valve 31 closes hermetically the vacuum reservoir 12 and opens the suction port 25 to the air and the second switchover valve 32 closes hermetically the exhaust port 26. As a result, the vacuum pressure within the vacuum chamber 10a remains at a value to ensure the operation of the booster 10 and the air sucked into the suction port 25 is compressed and stored within the discharge chamber 64 and the pumping chamber 65 of the vacuum pump 20. The positive pressure of the compressed stored air causes a pressure difference between the upper and lower sides of the diaphragm piston assembly 50 which is finally displaced downwardly against the biasing force of the coil spring 55. This downward displacement of the diaphragm piston assembly 50 disengages the operation rod 42 from the rocker arm 41, thereby to place the vacuum pump 20 in an inoperative state. When the vacuum pressure within the vacuum chamber 10a of the booster 10 decreases to or below the predetermined value, the sensor 30 ceases its signal generation so as to return the first and second switchover valves 31 and 32 to their normal or original positions. Then, the compressedly stored air within the discharge chamber 64 and the pumping chamber 65 is discharged into the intake-manifold I of the engine E through the exhaust port 26 which is now open. The air pressure being eliminated, the diaphragm piston assembly 50 is displaced upwardly by the coil spring 55 to engage the operation rod 42 with the rocker arm 41. Thus, the vacuum pump 20 returns to its operative state.

In this embodiment, the operation rod 42 is so constructed as to be disengageable from the rocker arm 41 to block the rotation torque transmission from the eccentric cam 40. The torque transmission block may be accomplished by making the rocker arm 41 disengageable from the eccentric cam 40 or by other proper constructions. Particularly in this embodiment, engine torque loss by driving the vacuum pump 20 in vain is prevented since the eccentric cam 40 is disengaged from the driven parts or portions of the vacuum pump 20 while the brake booster 10 is in its inoperative state.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a control system for a diaphragm vacuum pump drivingly connected to a power source to ensure operation of a pneumatically operated device, the improvement comprising, a vacuum sensor in communication with the vacuum chamber of said device for detecting a predetermined vacuum pressure to ensure the operation of said device and generating an output signal therefrom, means for pneumatically connecting the suction port of said pump to said vacuum chamber of said device, and a switchover means disposed within said pneumatic connection between said suction port and said vacuum chamber to be activated in response to said output signal from said sensor to selectively open the pumping chamber of said pump to the air through said suction port and close said vacuum chamber of said device.

2. A control system for a diaphragm vacuum pump as claimed in claim 1, wherein the exhaust port of said vacuum pump is connected to the air.

3. A control system for a diaphragm vacuum pump as claimed in claim 1, wherein said power source is an engine of a vehicle and said vacuum pump is connected at its exhaust port to an intake-manifold of said engine.

4. A control system for a diaphragm vacuum pump as claimed in claim 3, wherein the driving connection between said power source and a spring loaded diaphragm piston of said vacuum pump is detachable and a second switchover means is disposed within the pneumatic connection between said exhaust port of said vacuum pump and said intake-manifold to be activated in response to said output signal from said sensor to selectively close said exhaust port, whereby upon activation of said second switchover means, said diaphragm piston is separated from said power source due to positive pressure exerted within the pumping chamber of said pump.

5. A control system for a diaphragm vacuum pump as claimed in claim 1, wherein a vacuum reservoir is disposed within said pneumatic connection between said switchover means and said vacuum chamber of said device to store vacuum pressure therein so as to ensure the operation of said device.

6. A control system for a diaphragm vacuum pump as claimed in claim 1, wherein said switchover means is a switchover solenoid valve to be energized by said output signal of said sensor.

* * * * *